(12) United States Patent
Roopnarine

(10) Patent No.: US 10,530,204 B2
(45) Date of Patent: Jan. 7, 2020

(54) ROTOR FOR ELECTRIC MACHINES

(71) Applicant: Roopnarine, New York, NY (US)

(72) Inventor: Roopnarine, New York, NY (US)

( * ) Notice: Subject to any disclaimer, the term of this patent is extended or adjusted under 35 U.S.C. 154(b) by 131 days.

(21) Appl. No.: 15/622,066

(22) Filed: Jun. 13, 2017

(65) Prior Publication Data

US 2018/0358852 A1    Dec. 13, 2018

(51) Int. Cl.
*H02K 1/27*    (2006.01)

(52) U.S. Cl.
CPC ............ *H02K 1/276* (2013.01); *H02K 1/2773* (2013.01)

(58) Field of Classification Search
CPC ............................... H02K 1/276; H02K 1/2766
See application file for complete search history.

(56) References Cited

U.S. PATENT DOCUMENTS

| | | | |
|---|---|---|---|
| 4,179,634 A | 12/1979 | Burson | |
| 5,811,908 A | 9/1998 | Iwata | |
| 6,147,428 A * | 11/2000 | Takezawa | H02K 1/2766 310/156.57 |
| 6,234,767 B1 * | 5/2001 | Takeda | H02K 1/276 417/355 |
| 6,548,932 B1 | 4/2003 | Weiglhofer | |
| 6,603,232 B2 | 8/2003 | Van Dine | |
| 6,856,051 B2 * | 2/2005 | Reiter, Jr. | B22F 7/06 29/598 |
| 7,205,695 B2 * | 4/2007 | Smith | G01N 29/041 310/156.38 |
| 7,358,637 B2 * | 4/2008 | Tapper | H02K 1/2773 310/156.08 |
| 8,058,763 B2 | 11/2011 | Clark | |
| 8,487,496 B2 | 7/2013 | Ifrim | |
| 8,772,994 B2 | 7/2014 | Feng | |
| 9,979,246 B2 * | 5/2018 | Helbling | H02K 1/30 |
| 2015/0061441 A1 * | 3/2015 | Figgins | H02K 1/2773 310/156.01 |
| 2017/0040854 A1 * | 2/2017 | Saint-Michel | H02K 3/12 |

* cited by examiner

*Primary Examiner* — Michael C Zarroli

(57) ABSTRACT

The invention is a rotor design for electric machines that is suitable for both high speed operation and improved efficiency. Methods to retain embedded permanent magnets against centripetal forces, while also significantly reducing flux leakage between poles of the magnets through the rotor laminations, are disclosed.

19 Claims, 9 Drawing Sheets

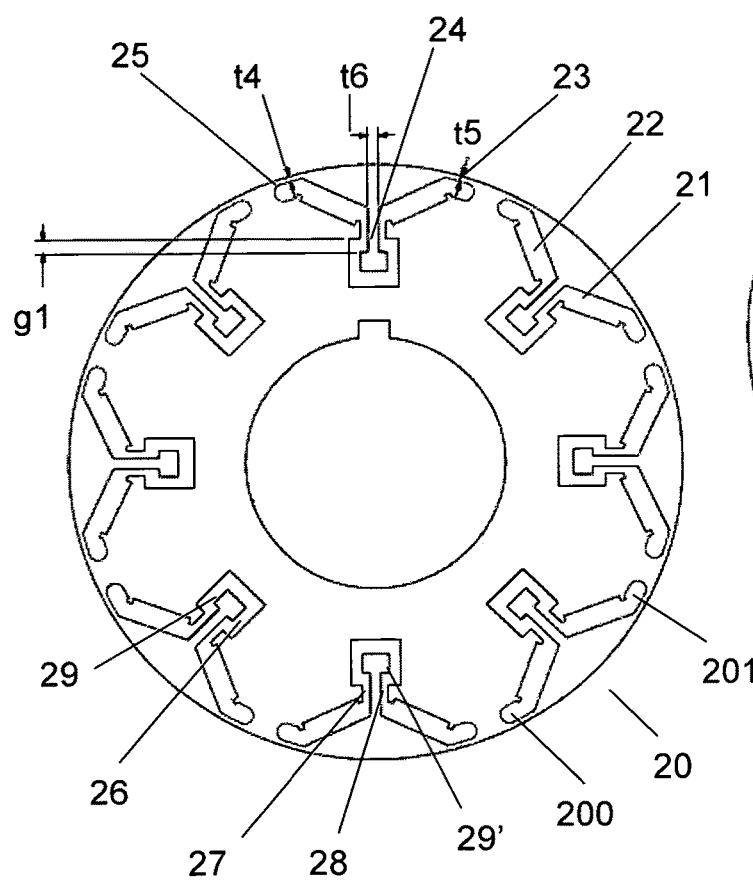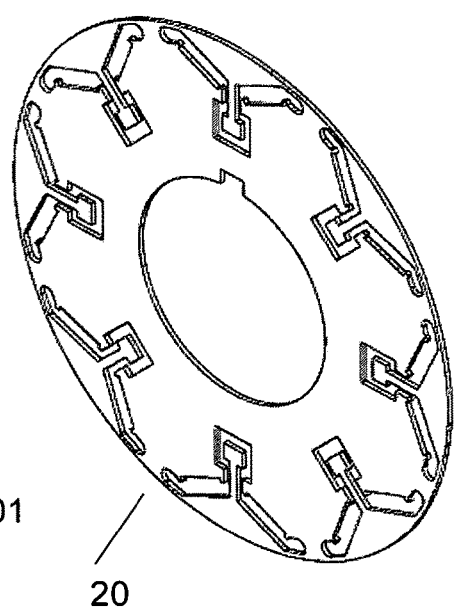
Figure 2a
Figure 2b

ROTOR FOR ELECTRIC MACHINES

TECHNICAL FIELD

This disclosure is in the field of electric machines; more specifically, those with rotors containing embedded permanent magnets or electric conductors. References to "motor" or "motors" subsequently are intended to include generators that are of the same construction, as noted.

BACKGROUND

A feature of some electric machines, for example, brushless direct current motors (BLDC) is that they contain permanent magnets mounted or embedded on the rotor. The manner in which these magnets are retained on the rotor shaft directly affects the permissible speed of rotation of the shaft because the magnets are subjected to centripetal forces that act to dislodge the magnets from their position. Various attempts have been made in prior art to retain magnets with some also considering the reduction of flux leakage between the magnets' poles. In general, there are two categories of rotor design; these are: surface mounted magnets and internally mounted or embedded magnets. In the first, the magnets are typically epoxied or mechanically fastened to flat surfaces on the circumference of the rotor's laminations. In this manner, the flux leakage between the poles of the magnets, through the laminations, is reduced or completely eliminated. These designs, however, severely restrict the speed capability of the rotor and most of the related prior art such as U.S. Pat. No. 4,179,634 to Burson, U.S. Pat. No. 5,811,908 to Iwata, et al, U.S. Pat. No. 6,548,932 to Weiglhofer, et al, U.S. Pat. No. 6,603,232 to Van Dine et al, U.S. Pat. No. 8,058,763 to Clark et al and U.S. Pat. No. 8,487,496 to Ifrim, et al, have sought to improve on mechanically retaining the magnets. Each of the aforementioned patents teaches the retention of magnets by inserting them into U-shaped channels which are then fastened or otherwise affixed to the periphery of a rotor shaft None of these magnet retention methods is relevant to the present invention which is related to the internally mounted or embedded magnet rotor designs. An example of related prior art is U.S. Pat. No. 8,772,994 to Feng, et al which teaches a rotor lamination design that seeks to reduce flux leakage between magnetic poles and maintain mechanical strength needed to retain the magnets. As such, Feng et al trade strength of the retaining features of the lamination against thin (or small cross-section) flux pathways to reduce flux leakage. Furthermore, the geometrical construction of the rotor laminations is a trade between the strength of the material (e.g., silicon or electrical steel) versus the desire to limit field losses from the embedded magnets.

FIG. 1 is one example of the prior art lamination 10 used in a brushless DC motor. In this case, the magnets with nominal thickness and width h and w, respectively, are inserted into the laminations into an array of slots 11, 12 with the same nominal thickness and width h and w, to form magnetic pole pairs that are equally spaced at angle a around the periphery of the lamination. The angle of the slots b with respect to a radial line that bisects the magnetic pole pair, are defined to optimize performance of the motor and depends on factors that are well-known in the prior art, such as, the number of pole pairs, the size of the magnets, the rotor diameter, the trade between reluctance and magnetic torque production, etc. If the slots 11, 12 in the laminations were entirely rectangular with nominal dimensions h and w, there would be significant magnetic flux leakage between the poles of the embedded magnets. To reduce this leakage, additional pockets 13, 14 are created in the lamination by removing additional material from the slots so as to form thin bridges 15, 17 near the outer diameter of the lamination. The strength of the thin-walled sections of bridges 16, 16 and 17 limits the amount of centripetal force that can be applied to the rotor shaft; this limits the speed capability of the machine and thus its performance. When the thicknesses t1, t2 and t3 (nominally, t1 and t2 are equal) are sized for strength, they do represent potential for parasitic field losses across bridges 15, 16 and 17; this lowers the efficiency of the machine. In another example of the prior art, bridge 16 is eliminated altogether and the slot for each magnet in a pole pair is open to each other in a continuous V-shape. In this arrangement, all of the forces resisting the centripetal forces on the magnets must be reacted by remaining bridges 15 and 17 which imposes a further constraint on their size.

SUMMARY OF INVENTION

The disclosed invention, an optimized rotor assembly, is comprised of three key features, these are: (1) a geometric design of the slots in the lamination that retain the magnets and a spacer (2) the use of non-magnetic, laminated, spacers that are interspersed between the magnetic laminations and (3) the use of secondary magnets to focus flux of the primary magnets in the assembly. Each of these features will be fully described. The primary object of this invention is to disclose a rotor construction that will enable a motor to run at higher speeds by providing optimum means of increasing strength while being able to minimize magnetic field losses. The invention is a novel construction of a rotor for electric machines in which said rotor has either permanent magnets or electrical conductors embedded in it. In the case of the former, the design is useful in that it reduces flux leakage between the poles of the embedded magnets and for both cases, the rotor design increases the operational speed capability of the machine. Inherent to the design of the rotor laminations of a brushless motor, for example, is the desire to reduce flux leakage while increasing speed; however, these two parameters have to be traded against each other because the design of one directly influences the design of the other. The present invention overcomes this dependency and thus enables the design of a more efficient and powerful machine when compared to a similarly sized, prior-art based, design.

Other objects, features, and advantages of the present invention will be explained in the following detailed description of the invention having reference to the appended drawings.

BRIEF DESCRIPTION OF DRAWINGS

FIG. 1b is an isometric view of the prior art lamination of FIG. 1a.

FIG. 2a depicts the improved lamination geometry according to the invention.

FIG. 2b is an isometric view of the lamination of FIG. 2a.

FIG. 4b is an isometric view of the spacer of FIG. 4a.

DETAILED DESCRIPTION OF INVENTION

In the following detailed description of the invention, certain preferred embodiments are illustrated providing certain specific details of their implementation. However, it will be recognized by one skilled in the art that many other variations and modifications may be made given the disclosed principles of the invention.

Figure 1A:
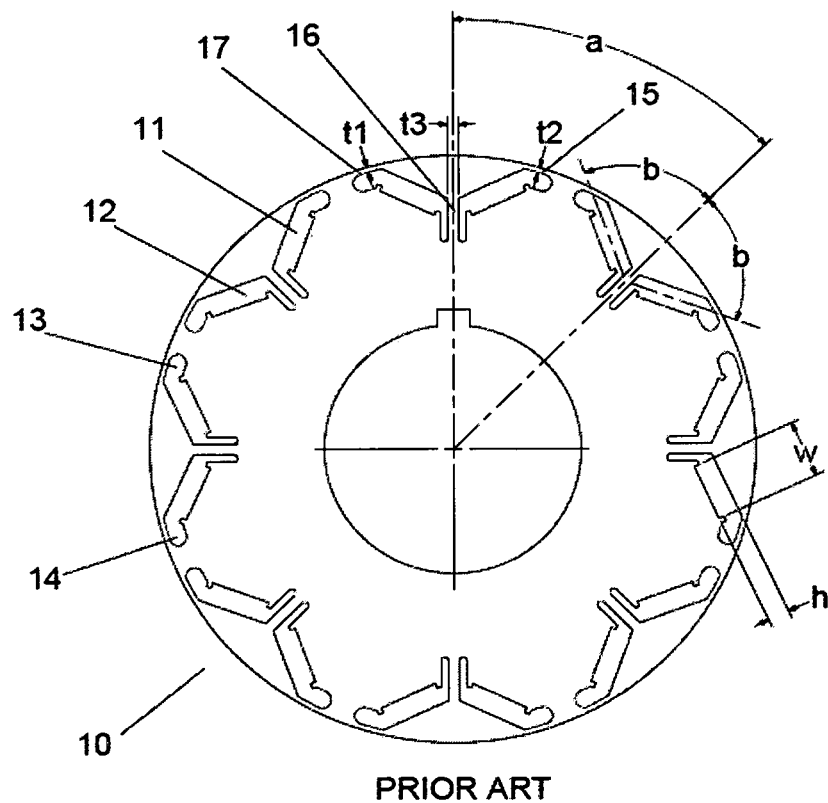
FIG. 1a is one example of a lamination design used in a prior art electrical machine.
Figure 1B:
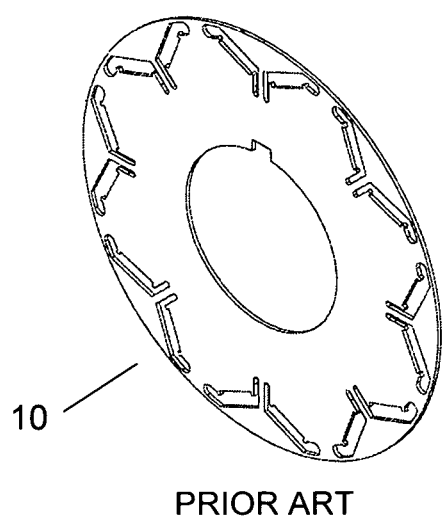
Figure 2C:
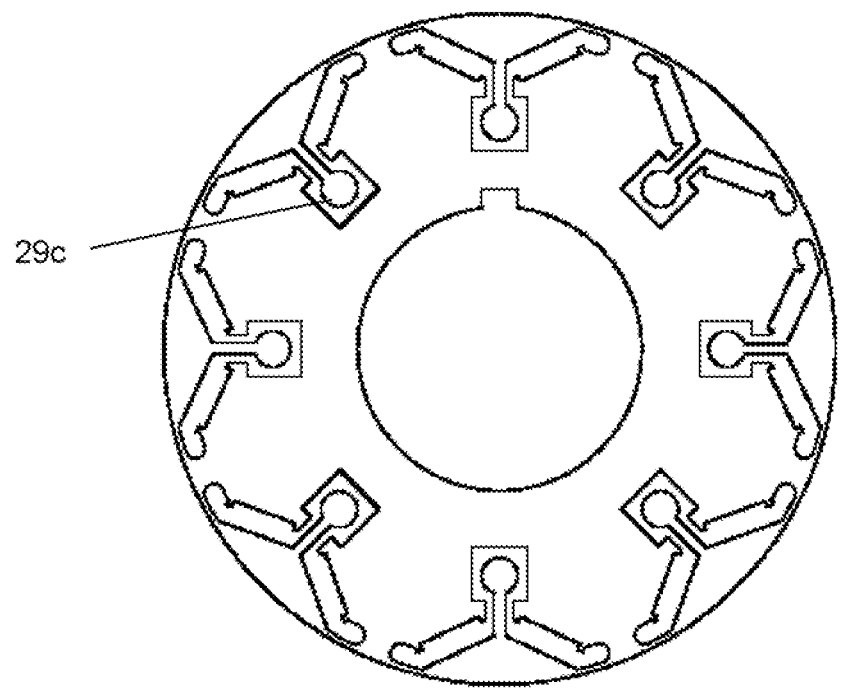
FIG. 2c is an alternate configuration of the improved geometry lamination.
Figure 2D:
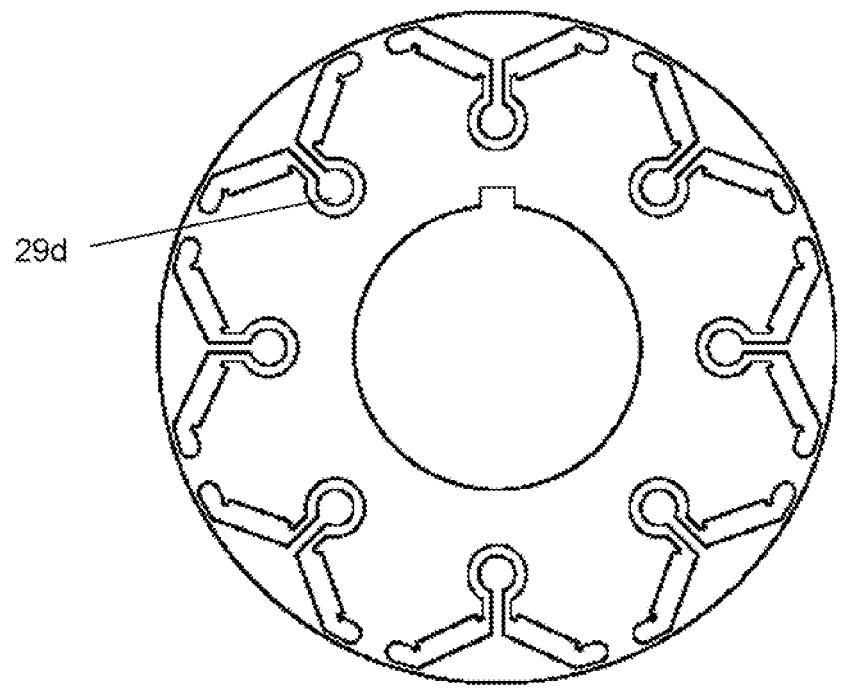
FIG. 2d is an alternate configuration of the improved geometry lamination.
Figure 2E:
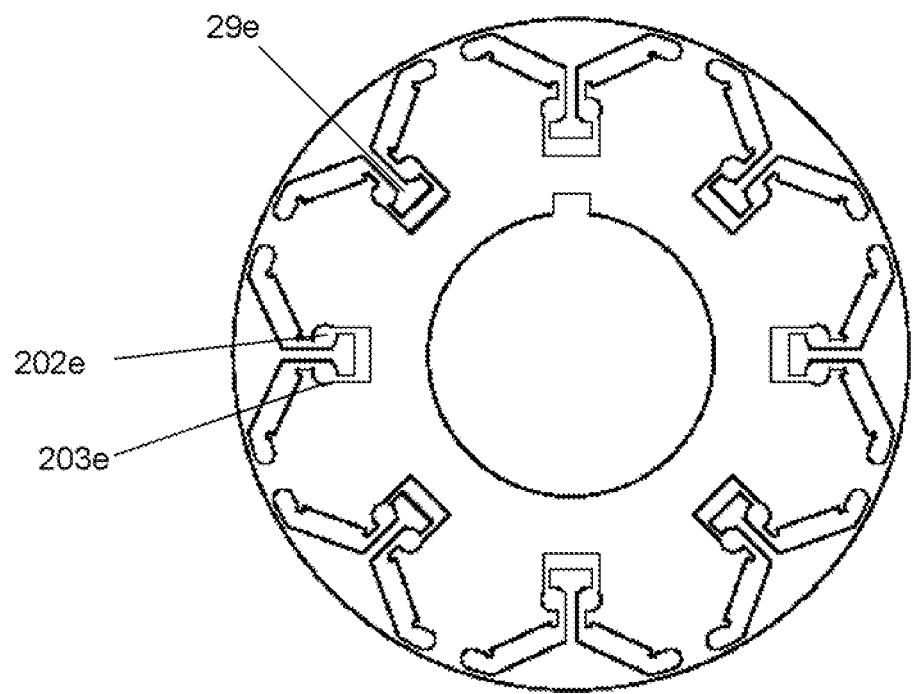
FIG. 2e is an alternate configuration of the improved geometry lamination.
Figure 2F:
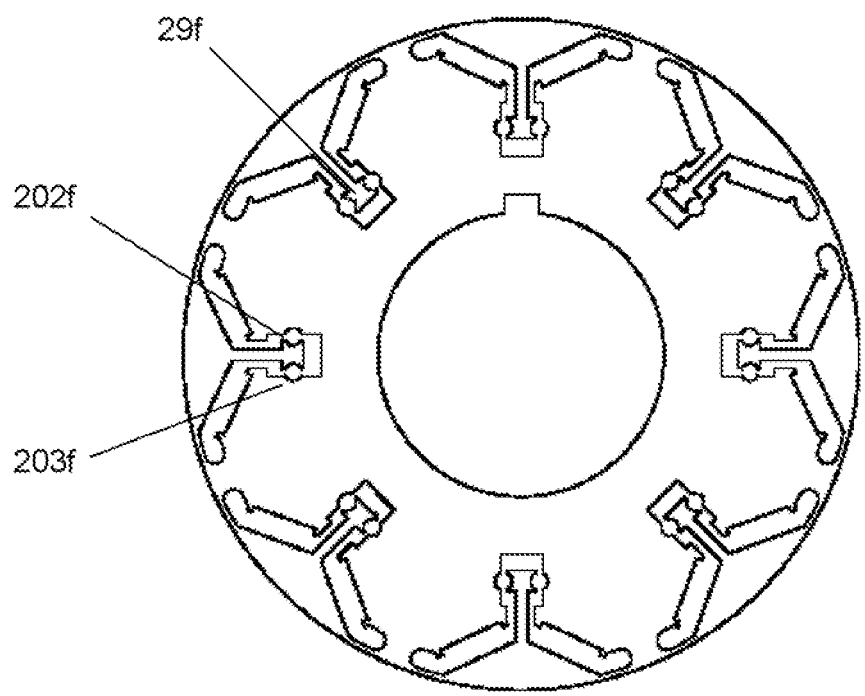
FIG. 2f is an alternate configuration of the improved geometry lamination.
Figure 2G:
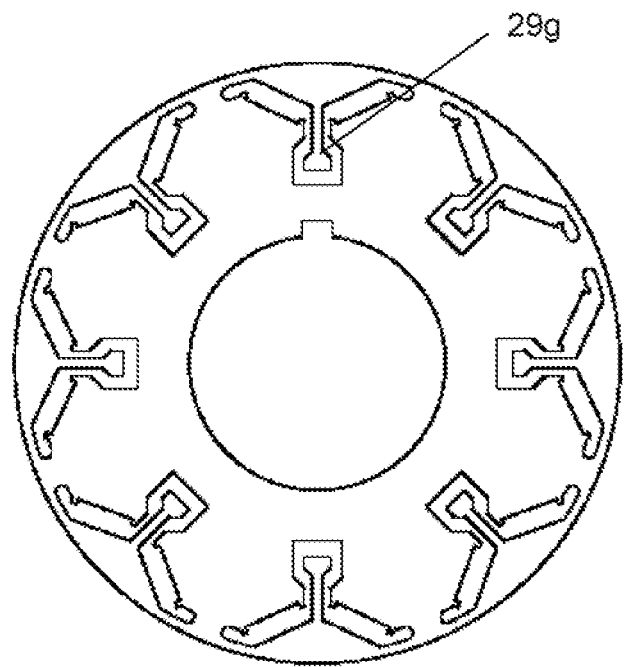
FIG. 2g is an alternate configuration of the improved geometry lamination.

A primary object of the magnet retention geometry, stamped or cut into the lamination, is to minimize the parasitic losses associated with flux flow from the embedded magnets' north to south poles through the lamination itself. Consequently, thin sections or "bridges" are used to reduce or limit, because of saturation, the amount of flux flow possible. However, as noted above, the thinness of these sections is limited by the need for them to have enough mechanical strength to retain the magnets which are subjected to centripetal forces. The improvement in the lamination design 20 of the invention, depicted in FIG. 2a and FIG. 2b, directly affects the central bridge 24 located between a magnet pair. In on example of the prior art, the central bridge 16 forms a continuous path to the rest of the lamination and thereby also provide a continuous magnetic path, like bridges 15 and 17, which results in parasitic losses. The disclosed improvement interrupts the magnetic flux leakage path through bridge 24 when slots 26 merge with slots 21 and 22 via cutouts 27 and 28. The result is that bridge 24 can be made much stronger because there is no pathway leading to field losses. A direct result of making bridge 24 stronger, by increasing thickness t6, is that it permits a weaker design of the peripheral bridges 23, 25 located near the outer diameter of the lamination. This means that thicknesses t4 and t5 can be made smaller than in the prior art; this, in turn, means that bridges 23, 25 will magnetically saturate at lower flux levels and thus further reduce the amount of loss. The sizing of the thicknesses t4, t5 and t6 are determined by structural analysis and are based on the desired speed of rotation, the mass of the magnets, the rotor diameter and the electromagnetic forces on the laminations during excitation of the stator. Knowing these parameters, a determination can be made of the total force on the laminations and consequently, the size of the bridges 23, 24 and 24 can be calculated. This process can be done iteratively in conjunction with analyses of the flux leakage through the bridges to form an optimum design of the rotor.

Figure 3:
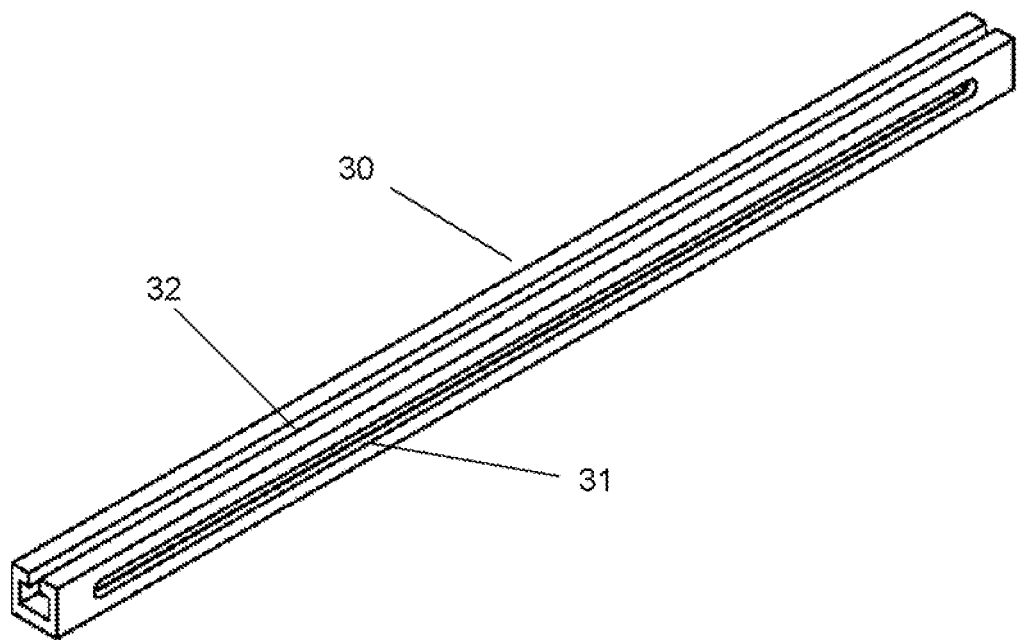
FIG. 3 depicts a non-magnetic insert or retainer used for structural support.

In order to structurally support the open end of truncated bridge 24, a tab 29 is added to interlock it in a radial direction with the rest of the lamination via the non-magnetic spacer or insert 30 depicted in FIG. 3. The spacer 30 is inserted, like the permanent magnets, into slots 26 of the lamination. Slots 26 define the contours of tabs 29 such that there is at least one shoulder 29' that can be radially captured or interlocked with spacer 30.

Spacer 30 may have slots 31 in order to reduce its weight and a slot 32 along its full length to enable its insertion over bridge 24; thus, the width of slot 32 is nominally the same as thickness t6 of bridge 24. Spacer 30 may simply be a flat bar or bars inserted into gap g1 between the shoulder 29' of tab 29 and the outermost edge of slot 26.

Different configurations of the tab 29 are shown in FIG. 2c through FIGS. 2g as 29c, 29d, 29e, 29f and 29g, in sequence. Tab 29c is radially retained by a non-magnetic spacer or insert that has a rectangular cross-section with a hole that is nominally equal to the diameter of the tab; a slot nominally equal to thickness t6 runs down the length of the spacer to form an open end. Tab 29d is radially retained by a non-magnetic spacer or insert that has a circular cross-section with a hole that is nominally equal to the diameter of the tab and a slot nominally equal to thickness t6 runs down the length of the spacer. Tab 29e is radially retained by non-magnetic cylindrical pins that are inserted into openings 202e and 203e. Similarly, Tab 29f is radially retained by non-magnetic cylindrical pins that are inserted into openings 202f and 203f. Tab 29g is radially retained by a non-magnetic spacer or insert that has a rectangular cross-section with a dovetailed slot.

Figure 4A:
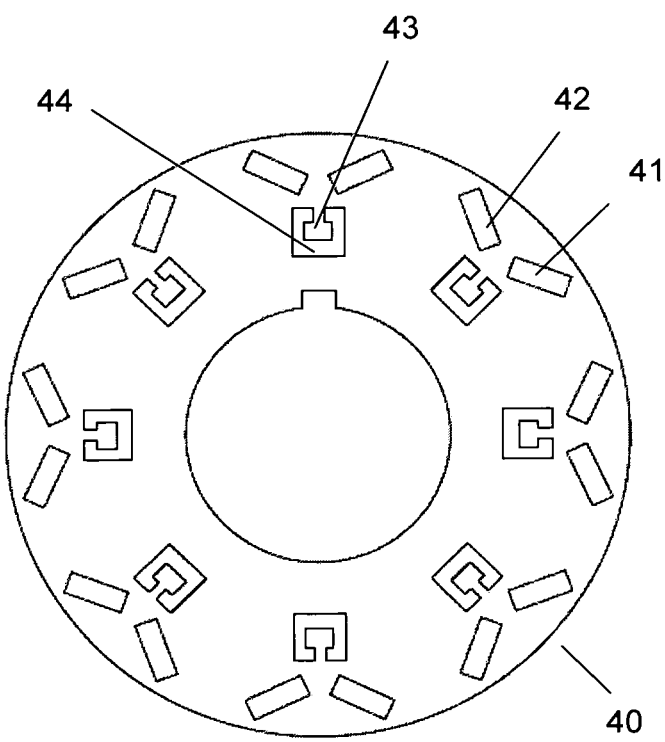
FIG. 4a depicts a non-magnetic lamination spacer used for structural support.
Figure 4B:
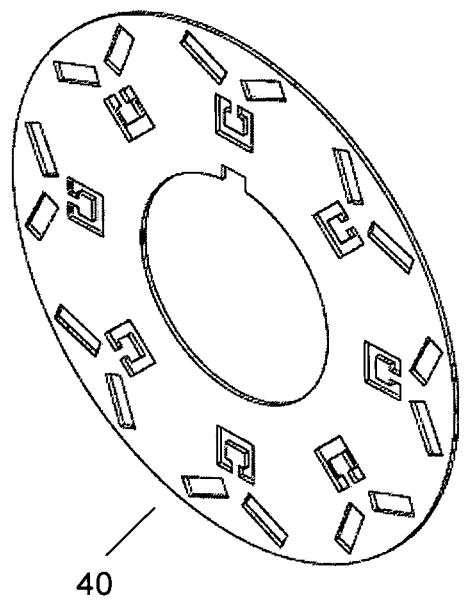

The second element of the improved rotor design is the use of non-magnetic lamination spacers 40 interspersed in the axial stack of (magnetic) laminations 20. The spacers 40, depicted in FIG. 4a and FIG. 4b, are to be of the same order of thickness as the magnetic laminations 20 and can be made, for example, from titanium, aluminum or a non-magnetic stainless steel. Slots 41 and 42 have the same nominal thickness and width as the magnets, slot 44 has the same nominal dimensions as the cross-section of spacer 30 and consequently, tab 43 is defined as being identical to tab 29. Because spacers 40 are non-magnetic, there is no need to form thin bridges such as 23, 24 and 25 on the magnetic laminations 20 to reduce flux leakage or flow. As such, non-magnetic laminations 40 are inherently stronger than magnetic laminations 20 and when interspersed into the rotor lamination stack, they become the main structural component of the rotor. An optimized design of the rotor will make a determination as to the number of spacers 50 to be used and their locations in the stack. By treating the entire lamination stack of spacers and magnetic laminations as a spring arrangement, it is possible to determine the loading on laminations 20 and 40. The arrangement, however, will lead to a reduction in the load carried by the magnetic laminations 20 and thus, enable the use of thinner bridges 23, 24 and 25 which, therefore, will reduce parasitic magnetic field losses. The number of spacers 40 to be used in the rotor stack is selected such that the overall magnetic field distribution (between the rotor and stator) is negligibly, if at all, affected.

Figure 5:
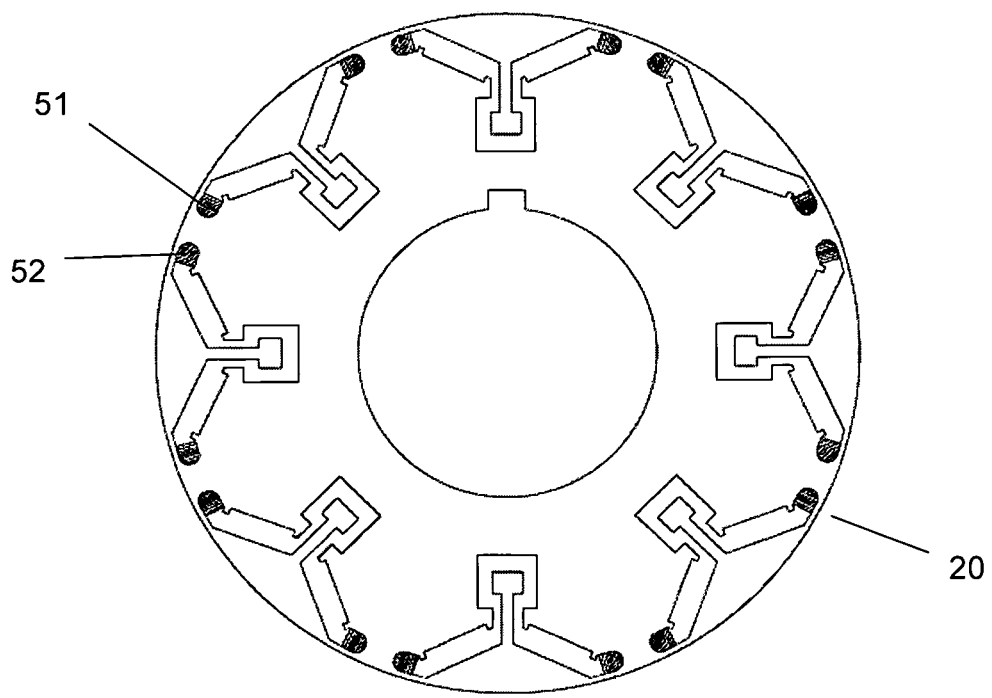
FIG. 5 depicts the use of secondary magnets for flux focusing of the primary magnets.

The final element of the improved rotor design employs a secondary set of magnets 51, 52 to focus the flux from the primary magnets into the air gap with the stator. These secondary magnets are inserted into the pockets 200 and 201 near the peripheral bridges of lamination 20 as depicted in FIG. 5. The magnets 51, 52 are inserted such that their poles are oriented in the same manner as those of the primary magnets in the slot they occupy. As a consequence, the peripheral bridges 23, 25 are saturated by the secondary magnets rather than with flux from the primary magnets which is therefore directed into the machine's air gap to increase its performance. The secondary magnets 51, 52 need not be of the same quality or type as the primary magnets.

Figure 6A:
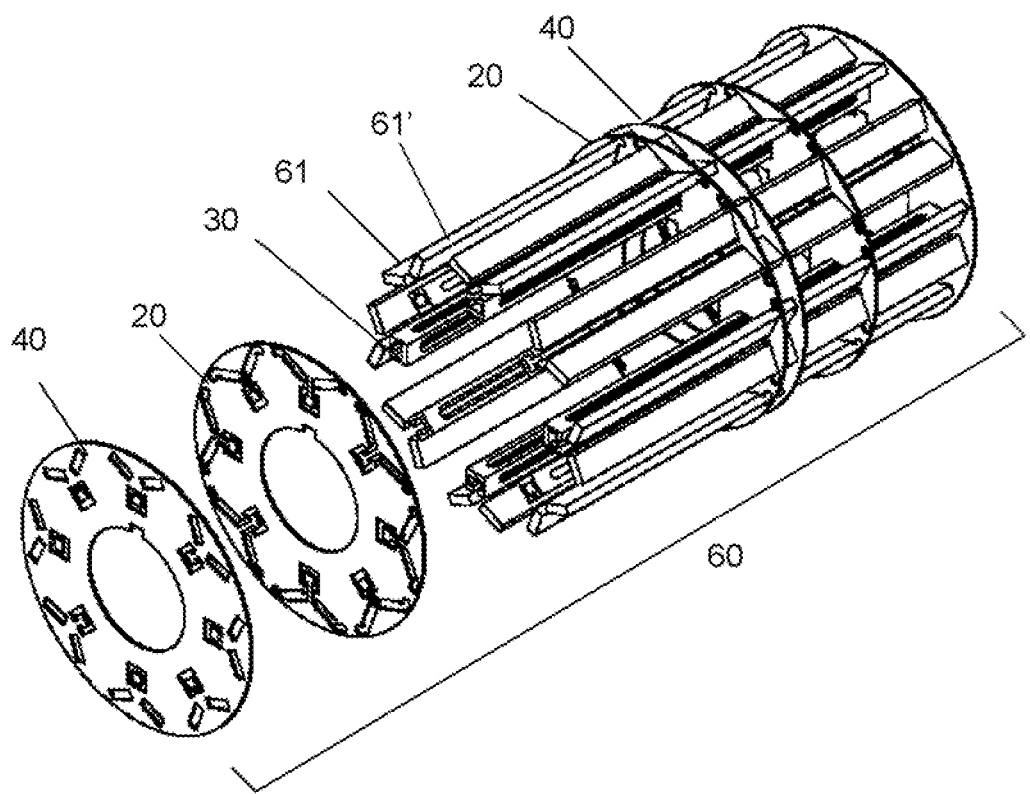
FIG. 6a is a semi-exploded view of the rotor assembly (not all laminations shown, for clarity).
Figure 6B:
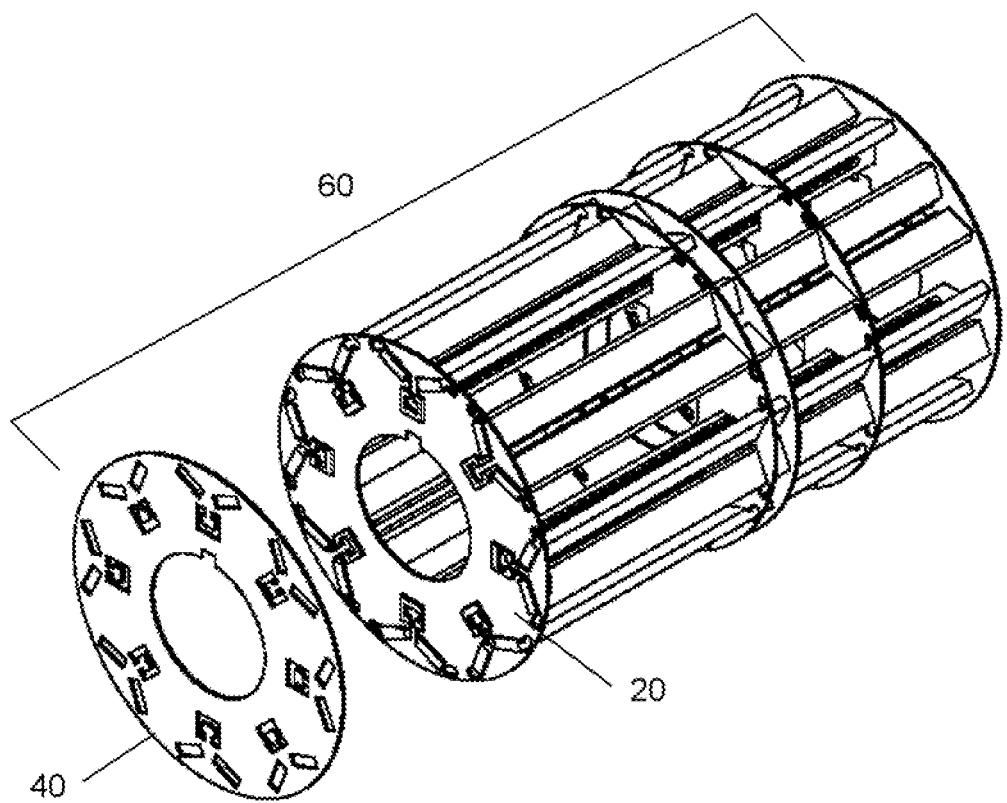
FIG. 6b is another semi-exploded view of the rotor assembly (not all laminations shown, for clarity) with the non-magnetic lamination spacer off-set from the assembly.

FIG. 6a and FIG. 6b are semi-exploded views of the rotor assembly 60 according to the invention (note that secondary magnets 51 and 52 are not shown in the assembly). As shown, primary magnet pairs 61 and 61' are inserted into a stack of magnetic laminations 20 (note, not all laminations are shown for clarity) that are held together by welding or other means of mechanical fastening or joining. Non-magnetic laminations 40, may be interspersed at various locations in the assembled stack so as to provide another means of retaining the magnets. Non-magnetic spacers or inserts 30, are also inserted into the lamination stack to capture and retain tabs 29 and thus primary magnets 61 and 61', against centripetal forces. While magnets 61 and 61' and the spacer or inserts 30 are depicted as one continuous part in the axial direction, these parts may be axially segmented. If secondary magnets 51 and 52 are included in an optimum design of the rotor, they will necessarily have to be axially segmented in order to be inserted between the non-magnetic lamination spacers 40.

Figure 7:
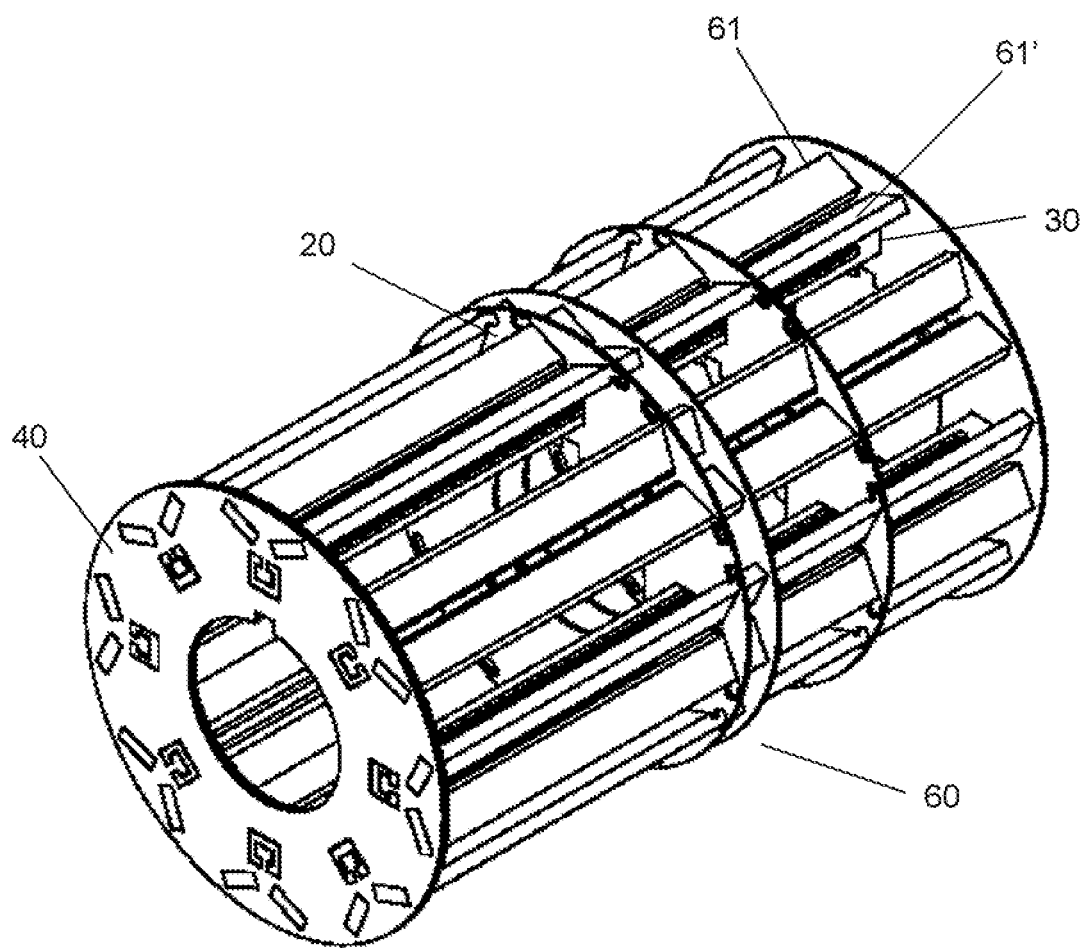
FIG. 7 shows the rotor assembly (not all laminations shown, for clarity).
Figure 8:
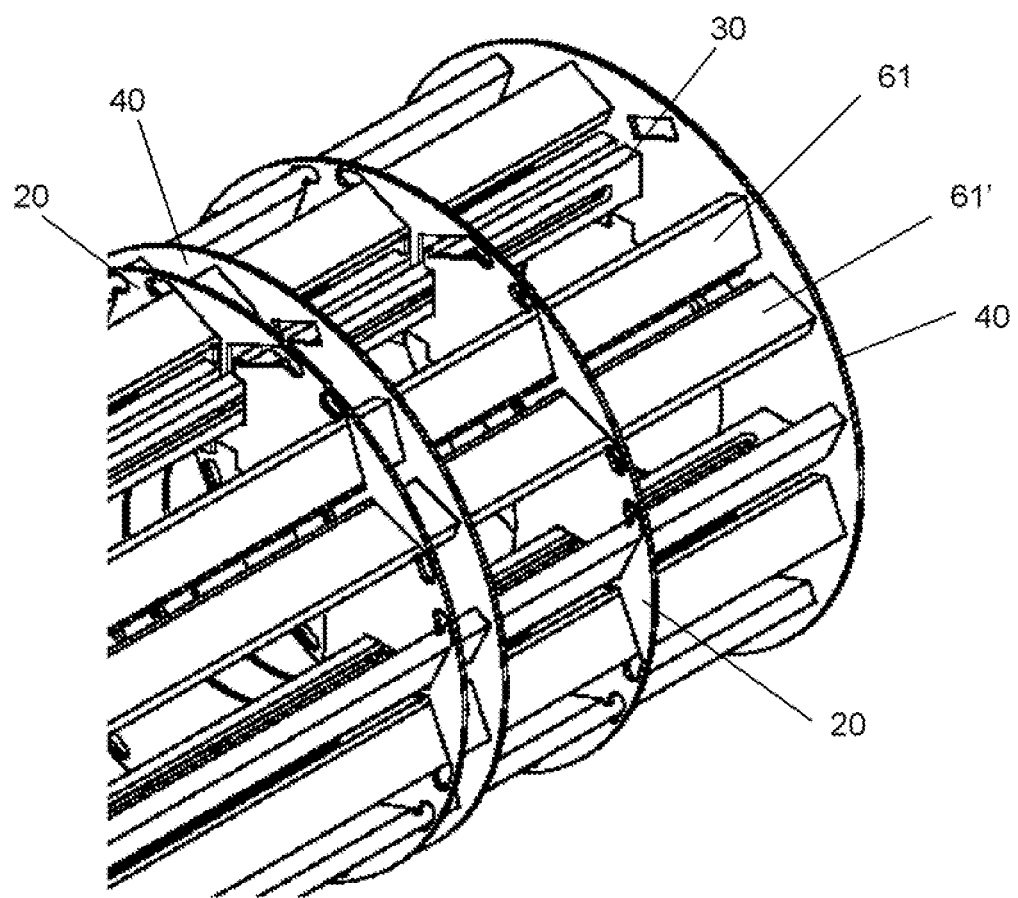
FIG. 8 is a close-up view of the rotor assembly (not all laminations shown, for clarity).

FIG. 7 shows the rotor assembly 60; not all laminations shown. Rotor assembly 60 is keyed or otherwise rotationally fixed to a shaft (not shown) for installation in an electric machine; the shaft is then supported on bearings (not shown). In the close-up view of FIG. 8, the relative configuration of the various elements of the rotor assembly is illustrated; the entire lamination stack is not shown for clarity and the magnet immediately above non-magnetic spacer or insert 30 was removed, again, for clarity.

The foregoing description is for the construction of an electric motor rotor in which permanent magnets are embedded. Clearly, there are alternate embodiments of the described features that can be implemented to achieve the same outcomes, that is, higher speed capability and better efficiency. Furthermore, while an optimized (for speed and efficiency) motor can be achieved by incorporating all of the aforementioned features, they can each be implemented individually, that is, independently of each other to obtain better performance relative to the prior art. It is also noted, that generators that can operate at higher speeds benefit from the same construction described herein.

It is understood that many modifications and variations may be devised given the above description of the principles of the invention. It is intended that all such modifications and variations be considered as within the spirit and scope of this invention, as defined in the following claims.

The invention claimed is:

1. A rotor for an electric machine that is comprised of:
    magnetic laminations mechanically fastened together to form a stack that is coupled to a shaft;
    said laminations contain a first array of slots that define cutouts or openings for inserting and embedding primary and optionally, secondary permanent magnets;
    said first array of slots extend beyond the width of the primary permanent magnets towards the periphery of the laminations to form thin bridges with the laminations' outer diameter and pockets between the primary permanent magnets and said thin bridges;
    said primary permanent magnets configured in pairs to form alternating north and south magnetic poles on the rotor;
    said laminations contain a second array of slots, equal to the number of magnetic poles, that define cutouts or openings for inserting non-magnetic spacers;
    said second array of slots also define an array of tabs located on lines of symmetry that bisect the magnetic poles such that at least one shoulder of said tabs engage or interlock with said non-magnetic spacers to retain the embedded permanent magnets against centripetal forces acting on the rotor.

2. Laminations for a rotor according to claim 1 in which the first array of slots is joined to the second array of slots by additional cutouts that are symmetrical about the radial lines bisecting the magnetic poles but perpendicularly offset from said radial lines to interrupt the magnetic flux path between the poles of the embedded magnets.

3. Laminations for a rotor according to claim 1 in which the first array of slots include pockets that extend the slots widthwise towards the periphery of the lamination to form thin bridges.

4. Laminations for a rotor according to claim 1 in which the second array of slots define an opening for insertion of the non-magnetic spacer and further define at least one shoulder on the tab that is constrained by said non-magnetic spacer from moving radially outwards under the influence of centripetal forces.

5. Laminations for a rotor according to claim 1 in which the width of the second array of slots is at least equal to the air gap of the electric machine.

6. Laminations for a rotor according to claim 1 in which the shoulder of the tabs is located at a radius less than that defined by the point at which extensions of the innermost surface of the magnets in a pole pair will intersect the radial line bisecting said magnetic pole pair.

7. Non-magnetic spacers according to claim 1 that are constructed from low permeability materials such as, aluminum, titanium, 300 series stainless steel, brass, zinc, carbon fiber or hard plastics.

8. Non-magnetic spacers according to claim 1 that are formed as an extrusion that have the same nominal dimensions and cross-sectional profile as the second array of slots.

9. Non-magnetic spacers according to claim 8 constructed from thin extruded segments that are then welded or epoxied together to form a single part for assembly into the rotor.

10. The rotor according to claim 1 in which the secondary magnets are embedded in the pockets formed between the primary permanent magnets and the thin bridges on the periphery of the first array of slots such that said secondary magnets saturate the thin bridges.

11. A rotor for an electric machine that is comprised of a stack of magnetic laminations with non-magnetic laminations interspersed and mechanically fastened together to couple to a shaft in which:
    the magnetic laminations are according to claim 1;
    the non-magnetic laminations contain a first array of slots that define cutouts or openings for inserting and embedding the primary permanent magnets;
    said non-magnetic laminations contain the second array of slots that define cutouts or openings for inserting the non-magnetic spacers;
    said second array of slots also define an array of tabs located on lines of symmetry that bisect the magnetic poles such that at least one shoulder of said tabs engage or interlock with said non-magnetic spacers to retain the embedded permanent magnets against centripetal forces acting on the rotor.

12. Non-magnetic laminations for the rotor according to claim 11 in which the first array of slots have the same nominal width and height as the embedded primary magnets.

13. Non-magnetic laminations for the rotor according to claim 11 in which the second array of slots have the same nominal width and height as the non-magnetic spacer.

14. Non-magnetic laminations for the rotor according to claim 11 in which the second array of slots define an opening for insertion of the non-magnetic spacer and further define at least one shoulder on the tab that is constrained by said non-magnetic spacer from moving radially outwards under the influence of centripetal forces.

15. Non-magnetic laminations according to claim 11 that are constructed from low permeability materials such as, aluminum, titanium, 300 series stainless steel, brass, zinc, carbon fiber or hard plastics.

16. Non-magnetic laminations according to claim 15 that have the same thickness as the magnetic laminations.

17. The rotor according to claim 11 in which the secondary magnets are embedded in the pockets on the periphery of the first array of slots on the magnetic laminations such that said secondary magnets saturate the thin bridges located near said pockets.

18. A rotor according to claim 1 in which said non-magnetic spacers are cylindrical pins.

19. A rotor according to claim 11 in which said non-magnetic spacers are cylindrical pins.

* * * * *